March 31, 1953     J. W. ANDERSON     2,632,910

CONNECTOR

Filed Oct. 1, 1947

INVENTOR.
JOHN W. ANDERSON
BY
Charles S. Penfold
ATTORNEY

Patented Mar. 31, 1953

2,632,910

UNITED STATES PATENT OFFICE 2,632,910

CONNECTOR

John W. Anderson, Gary, Ind., assignor to Productive Inventions, Inc., a corporation of Indiana Application October 1, 1947, Serial No. 777,217

12 Claims. (Cl. 15—250)

This invention relates to windshield wipers, and particularly to means for assembling the wiper blade and operating arm thereof in a manner to support the blade in operative position on the arm.

At the present time windshield actuating arms and wiper blades in use vary considerably in design and construction. An object of the invention is to provide a novel adaptable connecting means between actuating arms constructed with a slotted end portion for connection with a wiper blade assembly and a wiper blade assembly which cannot otherwise be used with such a slotted end construction of the actuating arm.

Another object of the invention is to provide means for mounting and removably securing the connecting adapter member on the operating arm.

Another object of the invention is to provide a unique one piece connecting member adapted to be connected to and removed from a wiping blade element and the operating arm therefor.

Another object of the invention is to provide a connecting element between the windshield actuating arm and the windshield wiper blade or element in which the connection assembly permits a free angular movement of the wiper blade on the surface to be wiped with sufficient rigidity of construction to prevent chattering of the wiper blade upon movement across the surface to be cleaned.

Another object of the invention is to provide an adapter of the character indicated which is inexpensive to manufacture, of durable construction, and of high efficiency in service.

Other objects and advantages of the invention will appear after the description hereinafter set forth is considered in conjunction with the drawing annexed hereto.

One embodiment of the invention is shown for illustrative purposes in the accompanying drawing, in which, Figure 1 is an enlarged side elevational view of the device;

Figure 3:
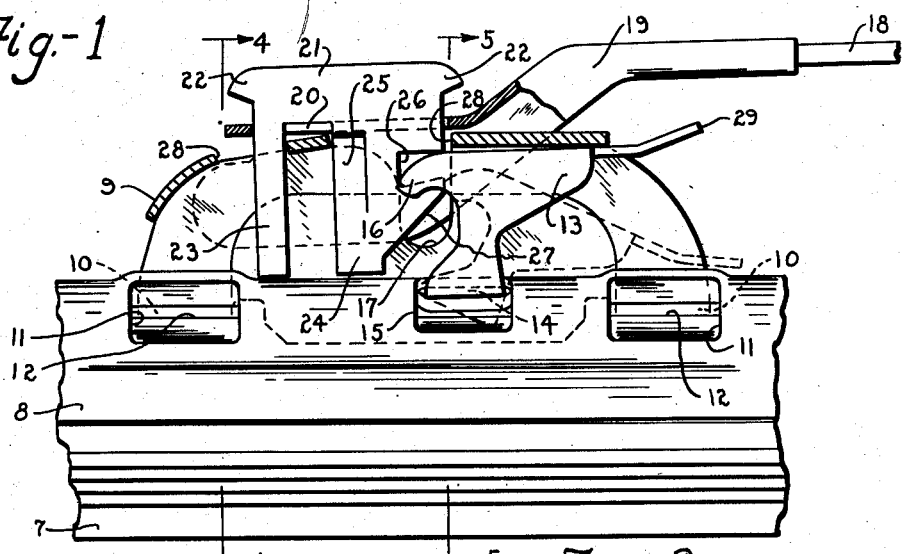
Figure 3 is an enlarged fragmentary side elevational view of the invention employed in connection with a slotted actuating arm and a wiper blade assembly.
Figure 4:
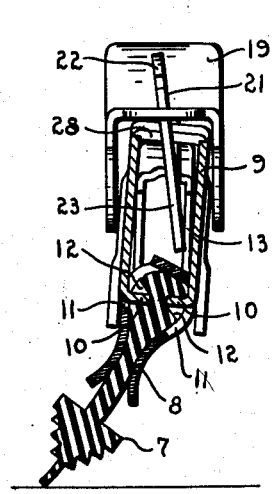
Figure 4 is an enlarged transverse sectional view taken substantially as indicated by the line 4—4 of Figure 3.
Figure 5:
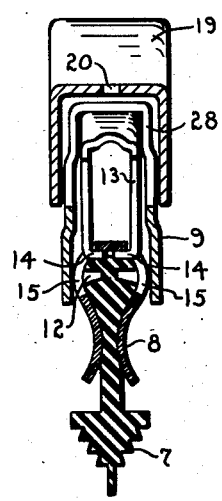
Figure 5 is an enlarged transverse sectional view taken substantially as indicated by the line 5—5 of Figure 3.
Figure 6:
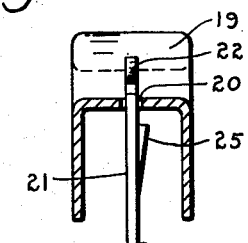
Figure 6 is an enlarged transverse section taken through an appropriate part of the assembly illustrated in Figure 2.

The present invention is shown in Figures 3 through 5 as operatively related to a windshield wiper blade and a wiper actuating arm. The wiper blade comprises a resilient wiping element 7, a channeled support 8 therefor, and a clip, fitting or rocker 9 attached to and supported by the wiping element 7 by means of two sets of inturned integral lugs or teeth 10 passing through clearance openings 11 struck out from each side of the channeled member 8 and engaging grooves 12 formed throughout the length of resilient element 7. The fitting or clip 9 includes a manually operable latch 13 resiliently supported by and pivoted on the resilient wiping element 7 by engagement of the integral inturned projections 14 through openings 15 in the channeled member 8. The hooked portion 16 normally serves as an upper closure for a recess 17 formed in the clip 9.

A typical wiper actuating arm 18 terminates in a channeled fitting 19 which receives the clip 9 and its base or central portion is provided with a slot, eyelet, or opening 20.

The wiper blade and actuating arm as described are illustrative of blades and arms in present use which cannot be connected to operate without additional connector means preferably in the form of an adapter, as provided in the present invention.

Figure 1:
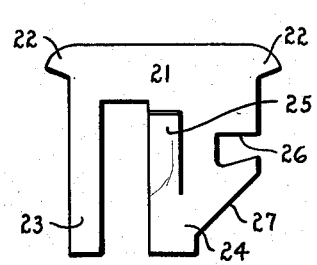
Figure 2:
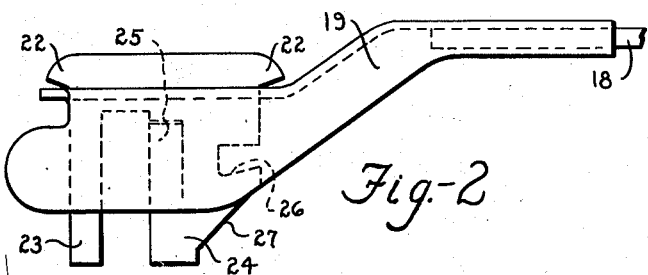
Figure 2 is an enlarged side elevational view of the device applied to the slotted end of a windshield wiper actuating arm.

For operatively connecting the channel shaped slotted fitting 19 of the arm 18 to the wiper blade clip mounting 9, a one piece flat connector or adapter, indicated as a whole by the numeral 21 in Figure 1, is provided, and comprises a top or bridge portion with overhanging retaining ears 22 at each end, and two depending legs 23 and 24 adapted to be inserted into the opening or slot 20 of the fitting arm. Leg 24 on its inner surface is struck out to provide a yieldable retaining lug 25 which yields or snaps under the edge of slot 20 in the end fitting 19 of the actuating arm 18 when the connector or converter 21 is inserted into the slot as shown in Figures 2, 3, 4 and 6. Leg 24 on its outer surface is provided with abutment means preferably in the form of a notch 26 which receives and engages the hooked portion 16 of the manually operated latch 13 when the connector is inserted into the clip 9, as shown in Figure 3. Leg 24 is cut off angularly or beveled as indicated by the numeral 27 in Figures 1, 2 and 3, to facilitate the entrance of the connector 21 into the cut-out portions or apertures 28 of the clip 9. The bevel also serves to engage the hook 16 of the latch and cam or retract the latch rearwardly so that the notch 26 will be presented for receiving the hook. Obviously, the notch 26 and the bevel 27 and the yieldable lug 25 could be formed on either side of either leg or both legs to cooperate with any specific wiper blade construction having a latch. Legs 23 and 24 may be of equal length and may or may not engage the channel section 8 as shown in Figure 3.

To assemble a wiper blade with a spring latch or holding means to operate with an actuating arm with a slotted terminal fitting, the connector 21 is preferably positioned with notch 26 toward the actuating arm 18 and then inserted through slot 20 in the base or front wall of end fitting 19 until the yieldable lug 25 of the connector yields or snaps into locking position upon movement past the under edge of the slot. Obviously, the connector may be inserted into the opening 20 so that the notch 26 and its bevel angle 27 are located in a reverse position. The converter or connector 21 is thereby loosely fastened to the actuating arm 18 through the slot 20 and is held loosely in the slot by the ears 22 which project beyond the length of the slot on the forward side of the fitting and by the lug 25 of the connector which by engagement with the under side of the base wall of the fitting, restrains the connector from being withdrawn from the slot.

The connector 21, thus assembled with the actuating arm 18, is inserted into the apertures 28 of the rocker or clip 9 of the wiper blade so that the angular side 27 of leg 24 will engage the hooked portion 16 and pivotally force it to an unlatched position against the resistance of the resilient wiper element 7, as indicated by dotted lines in Figure 3, whereupon the portion 16 will snap back into the opening or notch 26 of the connector to lock the connector in operative position with the clip. Attention is directed to the fact that the legs 23 and 24 of the connector are preferably of a length in excess of the width of the side walls of the fitting 19 so that the ends of the legs may be readily piloted into the apertures 28 before the fitting receives the clip 9. It will be noted that the connector does not in any way interfere with the tilting or rocking of the clip when the blade is moved back and forth across the surface to be cleaned.

The connector 21 with the arm 18 may be readily released from engagement with the wiper blade by first manually depressing lever 29 of latch 13 of the clip 9 which withdraws the hooked portion 16 of the latch from notch 26 of the connector, and then moving the arm and connector assembly away from the blade assembly. The connector 21 may in turn be released from arm 18 by depressing the yieldable lug 25 of the connector to permit passage of the legs 23 and 24 of the connector through slot 20 of the end fitting 19 of the arm 18.

The manner of attaching the clip 9 and latch means 13 associated with the clip to the wiper blade is claimed in the assignee's copending related application Serial No. 311,425, filed September 25, 1952.

While one of the preferred embodiments of the present invention has been illustrated and described, it is to be understood that various modifications in the material, form and assembly of the parts may be resorted to without departing from the spirit and scope of the invention as set forth in the appended claims.

I claim:

1. A connector for joining a windshield wiper blade and an actuating arm having a wall provided with an opening, said connector being adapted for insertion into the opening of said arm, stop means on the connector for engaging the outer side of the wall for limiting the extent of the insertion, and integral displaceable locking means on said connector for engaging the inner side of the wall for detachably holding the inserted connector to said arm.

2. A connector for joining the windshield wiper blade and an actuating arm having a wall provided with an opening, said connector being adapted for insertion into the opening of said arm, means engageable with the outer side of the wall for limiting passage of the connector through said opening, and means on said connector adapted to interconnect with means on the blade, said last-mentioned means on said connector also being insertable through the opening.

3. A connector for joining a windshield wiper blade provided with yieldable holding means and an actuating arm having a wall provided with an opening, said connector comprising a body portion for insertion into the opening of said arm, means to limit the passage of the said body portion through said opening, and said body portion extending through said opening and provided with means detachable with the yieldable holding means on said blade for detachably holding the connector to said blade.

4. A connector for joining a windshield wiper blade provided with yieldable holding means and an actuating arm having a wall provided with an opening, said connector comprising a body portion for insertion into the opening of said arm, means to limit the passage of the body portion through said opening, said body portion being provided with abutment means insertable into the opening and cooperable with the yieldable holding means on said blade, and means on said body portion for retracting the yieldable holding means when brought into engagement therewith.

5. A connector for joining a windshield wiper blade having a fitting provided with apertures and holding means and an actuating arm having a wall provided with an opening, said connector comprising a body portion for insertion into the opening of said arm, means to limit the passage of said body portion through said opening, said body portion having legs extending through said opening and said apertures in the fitting and provided with means interconnecting with the holding means of the fitting on said blade.

6. A connector for joining a windshield wiper blade provided with yieldable holding means and an actuating arm having a wall provided with an opening, said connector comprising a body portion for insertion into the opening of said arm provided with yieldable locking means for detachably holding the inserted connector to said arm and provided with means to limit its passage through said opening, said connector also being provided with abutment means adapted to cooperate with the yieldable holding means on said blade for detachably holding the connector to said blade, and said connector being further provided with means for retracting the yieldable locking means when brought into engagement therewith.

7. In combination, a windshield wiper blade provided with holding means, an actuating arm therefor having a wall provided with an opening, a connector for insertion into the opening of said arm, said connector being provided with locking means for detachably holding the inserted connector to said arm and with means adapted to cooperate with the holding means on said blade for detachably holding the connector to said blade, and means on the connector for retracting the holding means when brought into engagement therewith.

8. In combination, a windshield wiper blade provided with yieldable holding means, an actuating arm therefor having a wall provided with an opening, a connector having an inner body portion for insertion into the opening of said arm and provided with exterior means to limit its passage through said opening, and abutment means on said body portion, said limiting means and said abutment means cooperating with said arm and said holding means on the blade for simultaneously locking the connector to said arm and to said blade.

9. A windshield wiper arm provided with a wall portion having an opening therein, an arm connector disposed in said opening, abutment means on said connector engageable with the outer side of said wall portion for limiting movement of the connector in one direction, and means on said connector insertable through said opening engageable with the inner side of said wall portion for locking the connector to the arm and limiting its movement in another direction.

10. A connector for attaching a windshield wiper blade to an arm having a portion provided with an opening, said connector being constructed for insertion into said opening and provided with a pair of abutment means adapted for disposition on opposite sides of the said arm portion for holding the connector to the arm, and one of said abutment means being being resiliently flexible.

11. A connector for connecting a windshield wiper blade to an arm, said connector being substantially flat and including a pair of spaced apart legs arranged substantially in the same plane and joined together at one extremity by a bridge, abutment means provided on said bridge adapted to engage one side of an arm for limiting movement of the connector in one direction, one of said legs being provided with means adapted to engage the other side of the arm for holding the connector thereto and for limiting its movement in another direction, and said one leg being provided with an opening adapted to cooperate with means on a blade for attaching the connector thereto.

12. A connector for connecting a windshield wiper blade to a slotted arm, said connector being substantially flat and constructed in one piece, said connector having abutment means for engaging the outer side of the arm to limit movement of the connector in one direction, abutment means on said connector for engaging the inner side of an arm for limiting movement of the connector in an opposite direction, means on the connector for cooperation with an attachment on a blade, and one of said abutment means being resiliently flexible and formed for passage through a slot in an arm.

JOHN W. ANDERSON.

REFERENCES CITED

The following references are of record in the file of this patent:

UNITED STATES PATENTS

| Number | Name | Date |
| --- | --- | --- |
| 1,872,095 | Romano | Aug. 16, 1932 |
| 1,943,652 | Christen | Jan. 16, 1934 |
| 1,944,051 | Zaiger | Jan. 16, 1934 |
| 2,153,225 | Zaiger | Apr. 14, 1939 |
| 2,156,506 | Marcolivio | May 2, 1939 |
| 2,260,905 | Horton | Oct. 28, 1941 |
| 2,274,277 | Rouseau | Feb. 24, 1942 |
| 2,418,559 | Scina | Apr. 8, 1947 |